(12) United States Patent
Voss

(10) Patent No.: US 10,496,243 B2
(45) Date of Patent: Dec. 3, 2019

(54) METHOD AND APPARATUS FOR COLOR DETECTION TO GENERATE TEXT COLOR

(71) Applicant: THOMSON LICENSING, Issy de Moulineaux (FR)

(72) Inventor: Neil D. Voss, Darien, CT (US)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/022,019

(22) PCT Filed: Dec. 30, 2013

(86) PCT No.: PCT/US2013/078273
§ 371 (c)(1),
(2) Date: Mar. 15, 2016

(87) PCT Pub. No.: WO2015/038180
PCT Pub. Date: Mar. 19, 2015

(65) Prior Publication Data
US 2016/0227134 A1    Aug. 4, 2016

Related U.S. Application Data

(60) Provisional application No. 61/878,245, filed on Sep. 16, 2013.

(51) Int. Cl.
*H04N 5/278* (2006.01)
*G06F 3/0482* (2013.01)
(Continued)

(52) U.S. Cl.
CPC .......... *G06F 3/0482* (2013.01); *G06F 3/0485* (2013.01); *G06F 3/0488* (2013.01); *G06K 9/6215* (2013.01); *G06T 7/70* (2017.01); *G06T 7/90* (2017.01); *G06T 11/001* (2013.01); *G06T 11/60* (2013.01); *G11B 27/031* (2013.01); *H04N 1/622* (2013.01); *H04N 5/278* (2013.01);
(Continued)

(58) Field of Classification Search
CPC ....... G06T 7/90; H04N 21/4884; H04N 5/278
See application file for complete search history.

(56) References Cited

U.S. PATENT DOCUMENTS 5,126,832 A    6/1992 Lee et al.
7,050,109 B2    5/2006 Safadi et al.
(Continued)

FOREIGN PATENT DOCUMENTS

EP    1536635    6/2005
EP    1848203 A1    10/2007
(Continued)

OTHER PUBLICATIONS

Search Report dated May 15, 2014.
(Continued)

*Primary Examiner* — Asher D Kells
(74) *Attorney, Agent, or Firm* — Tutunjian & Bitetto, P.C.

(57) ABSTRACT

A method and apparatus for automatically selecting a color for overlay on an image or video for presentation on a media device. The system identifies the most prominent color in an image, finds the closest match to that color in a predetermined number of colors, and then uses the closest match color to color the font of the title that is overlaid on the image.

4 Claims, 11 Drawing Sheets

(51) Int. Cl.

| | | |
|---|---|---|
| *H04N 1/62* | (2006.01) | |
| *G11B 27/031* | (2006.01) | |
| *H04N 9/74* | (2006.01) | |
| *G06T 11/00* | (2006.01) | |
| *H04N 21/414* | (2011.01) | |
| *H04N 21/431* | (2011.01) | |
| *H04N 21/488* | (2011.01) | |
| *G06K 9/62* | (2006.01) | |
| *H04N 9/76* | (2006.01) | |
| *G06F 3/0485* | (2013.01) | |
| *G06F 3/0488* | (2013.01) | |
| *G06T 7/70* | (2017.01) | |
| *G06T 7/90* | (2017.01) | |
| *G06T 11/60* | (2006.01) | |
| *H04N 5/445* | (2011.01) | |

(52) U.S. Cl.
CPC ............... *H04N 9/74* (2013.01); *H04N 9/76* (2013.01); *H04N 21/41407* (2013.01); *H04N 21/4312* (2013.01); *H04N 21/4884* (2013.01); *H04N 2005/44526* (2013.01)

(56) References Cited

U.S. PATENT DOCUMENTS

| | | | |
|---|---|---|---|
| 7,324,118 | B2 | 1/2008 | Fujioka et al. |
| 7,450,177 | B2* | 11/2008 | Lee ............... H04N 5/44513 348/461 |
| 8,087,044 | B2 | 12/2011 | Krause et al. |
| 2003/0169366 | A1 | 9/2003 | Lenzi et al. |
| 2005/0195157 | A1 | 9/2005 | Kramer et al. |
| 2007/0257933 | A1* | 11/2007 | Klassen ............... G06T 11/001 345/593 |
| 2010/0083165 | A1 | 4/2010 | Andrews et al. |
| 2010/0107068 | A1 | 4/2010 | Butcher et al. |
| 2010/0260477 | A1 | 10/2010 | Zhang et al. |
| 2010/0278421 | A1* | 11/2010 | Peters ............... H04N 9/73 382/162 |
| 2011/0280476 | A1* | 11/2011 | Berger ............ G06F 17/30274 382/163 |
| 2012/0019513 | A1 | 1/2012 | Fong et al. |
| 2012/0056889 | A1 | 3/2012 | Carter et al. |
| 2012/0114249 | A1 | 5/2012 | Conwell |
| 2012/0127198 | A1* | 5/2012 | Gundavarapu ...... G09G 5/026 345/629 |
| 2013/0300761 | A1* | 11/2013 | Ahmed ............ G01J 3/463 345/595 |
| 2014/0075324 | A1* | 3/2014 | Howard ............ H04L 12/18 715/738 |
| 2015/0046148 | A1 | 2/2015 | Oh et al. |
| 2015/0052439 | A1 | 2/2015 | Pasquarette et al. |
| 2018/0322679 | A1* | 11/2018 | Kunkel ............ H04N 5/2723 |

FOREIGN PATENT DOCUMENTS

| | | |
|---|---|---|
| EP | 2076031 | 7/2009 |
| KR | 20080092098 A | 10/2008 |
| WO | 2013118197 A1 | 8/2013 |

OTHER PUBLICATIONS

Lan, Z. et al., "A Method of News Caption Location Based on C-Mean Clustering and Edge Detection" 2008 Congress on Image and Signal Processing (May 2008) pp. 620-624.

Liu, Y. et al., "A Robust Algorithm for Text Detection in Color Images" Proceedings of the 2005 Eight International Conference on Document Analysis and Recognition (ICDAR'05) (Aug. 2005) pp. 1-5.

* cited by examiner

METHOD AND APPARATUS FOR COLOR DETECTION TO GENERATE TEXT COLOR

This application claims benefit, under 35 U.S.C. § 365 of International Application PCT/US2013/078273 filed Dec. 30, 2013 which was published in accordance with PCT article 21(2) on Mar. 19, 2015 in English and which claims the benefit of U.S. Provisional Application No. 61/878,245 filed Sep. 16, 2013.

BACKGROUND OF THE INVENTION

Portable electronic devices are becoming more ubiquitous. These devices, such as mobile phones, music players, cameras, tablets and the like often contain a combination of devices, thus rendering carrying multiple objects redundant. For example, current touch screen mobile phones, such as the Apple iPhone or Samsung Galaxy android phone contain video and still cameras, global positioning navigation system, internet browser, text and telephone, video and music player, and more. These devices are often enabled on multiple networks, such as WiFi, wired, and cellular, such as 3G, to transmit and received data.

The quality of secondary features in portable electronics has been constantly improving. For example, early "camera phones" consisted of low resolution sensors with fixed focus lenses and no flash. Today, many mobile phones include full high definition video capabilities, editing and filtering tools, as well as high definition displays. With these improved capabilities, many users are using these devices as their primary photography devices. Hence, there is a demand for even more improved performance and professional grade embedded photography tools. Additionally, users wish to share their content with others in more ways that just printed photographs and do so easily. Users may upload content to a video storage site or a social media site, such as YouTube. However, users may wish to edit these photos before sharing and this editing ideally could be done on the mobile device. Users may wish to edit the length of a video, change color filters, brightness or other video effects. These features are not commonly available on mobile devices so users must first download the content to a computer to perform the editing. As this is often beyond either the skill level of the user, or requires too much time and effort to be practical, users often are dissuaded from sharing video content. These methods of sharing may include email, text, or social media websites, such as Facebook, twitter, YouTube or the like.

To alleviate some of the problems that exist with editing video and images on a device with limited user inputs some of the tasks may be automated by the device. These tasks may be automated according to user preferences, past user actions, or automated by the application. A problem arises when users wish to overlay captions on images. No one color is suitable for all images and videos. When titles are overlaid on images, they typically have either a default color or the user selects the color. The default color may not be pleasing. The user selected color may not be the most pleasing and takes time for the user to set the color on each image. In a video, colors change so users would have to change the caption color many times in a single video to ensure that that caption is viewable throughout the entire video. In practice, most systems use the default color text setting which is often not discernable from the image itself. It would be desirable to have a method of applying a caption overlaid on a video or image without extensive user interaction.

SUMMARY OF THE INVENTION

A method and apparatus for generating a color for a caption overlaid on a video or image in response to the colors of the video or image.

In accordance with an aspect of the present invention, an apparatus comprising an input for receiving a text string, a memory for storing an image, a processor for analyzing said image to determine a predominant color, to compare said predominant color to a plurality of colors to determine a matched color, wherein said matched color is one of said plurality of colors having a color closest to that of said predominant color, and a display for displaying said image and said text string wherein said text string is displayed in said matched color.

In accordance with another aspect of the present invention, a method for analyzing an image to determine a predominant color, comparing said predominant color to a plurality of colors to determine a matched color, wherein said matched color is one of said plurality of colors having a color closest to that of said predominant color, generating a text string, and displaying said image and said text string wherein said text string is displayed in said matched color.

In accordance with yet another aspect of the present invention, a method comprising the steps of determining a portion of and image having a second predominant color different from said matched color, and displaying said text string over said portion of said image.

BRIEF DESCRIPTION OF THE DRAWINGS

These and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

DETAILED DESCRIPTION OF THE PREFERRED EMBODIMENT

The exemplifications set out herein illustrate preferred embodiments of the invention, and such exemplifications are not to be construed as limiting the scope of the invention in any manner.

Figure 1:
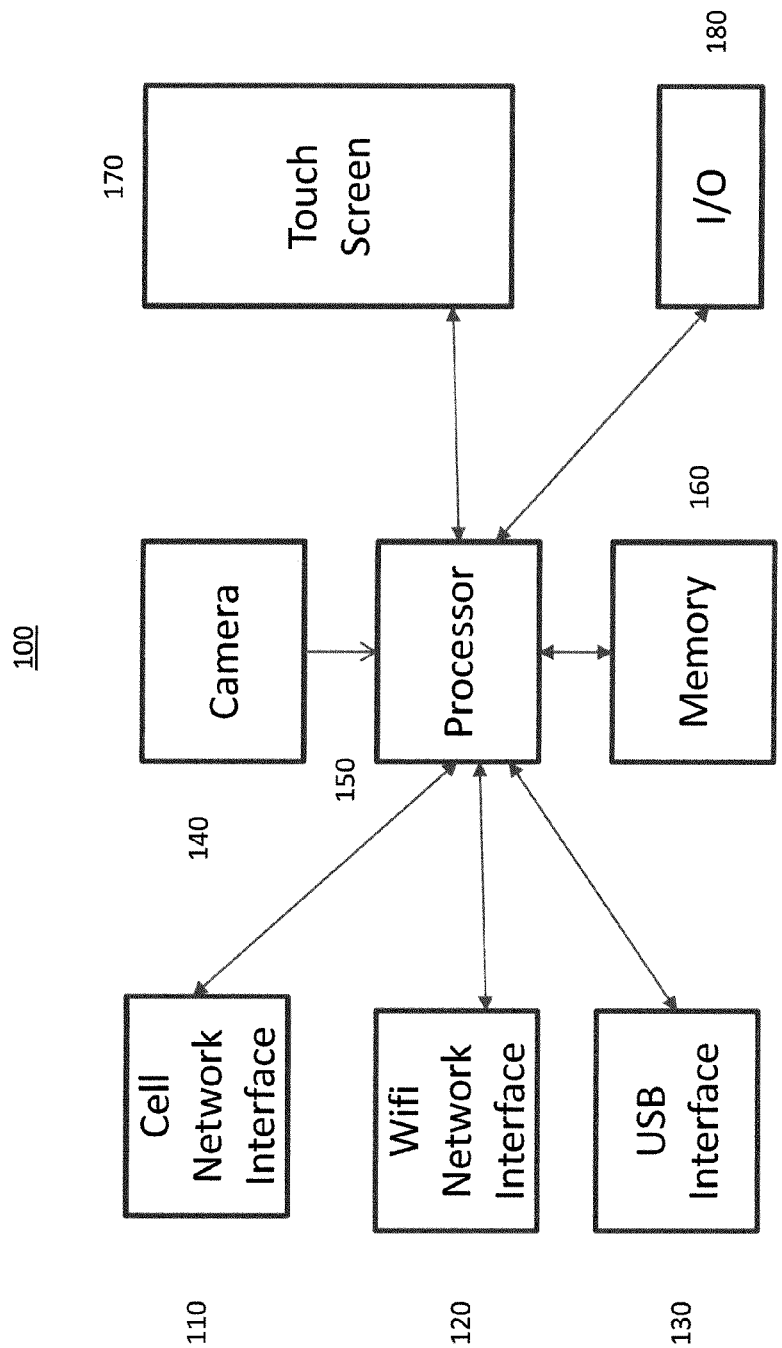
FIG. 1 shows a block diagram of an exemplary embodiment of mobile electronic device.

Referring to FIG. 1, a block diagram of an exemplary embodiment of mobile electronic device is shown. While the depicted mobile electronic device is a mobile phone 100, the invention may be implemented on any number of devices, such as music players, cameras, tablets, global positioning navigation systems etc. A mobile phone typically includes the ability to send and receive phone calls and text messages, interface with the Internet either through the cellular network or a local wireless network, take pictures and videos, play back audio and video content, and run applications such as word processing, programs, or video games. Many mobile phones include GPS and also include a touch screen panel as part of the user interface.

The mobile phone includes a main processor 150 that is coupled to each of the other major components. The main processor, or processors, routes the information between the various components, such as the network interfaces, camera 140, touch screen 170, and other input/output I/O interfaces 180. The main processor 150 also processes audio and video content for play back either directly on the device or on an external device through the audio/video interface. The main processor 150 is operative to control the various sub devices, such as the camera 140, touch screen 170, and the USB interface 130. The main processor 150 is further operative to execute subroutines in the mobile phone used to manipulate data similar to a computer. For example, the main processor may be used to manipulate image files after a photo has been taken by the camera function 140. These manipulations may include cropping, compression, color and brightness adjustment, and the like.

The cell network interface 110 is controlled by the main processor 150 and is used to receive and transmit information over a cellular wireless network. This information may be encoded in various formats, such as time division multiple access (TDMA), code division multiple access (CDMA) or Orthogonal frequency-division multiplexing (OFDM). Information is transmitted and received from the device trough a cell network interface 110. The interface may consist of multiple antennas encoders, demodulators and the like used to encode and decode information into the appropriate formats for transmission. The cell network interface 110 may be used to facilitate voice or text transmissions, or transmit and receive information from the internet. This information may include video, audio, and or images.

The wireless network interface 120, or wifi network interface, is used to transmit and receive information over a wifi network. This information can be encoded in various formats according to different wifi standards, such as 802.11g, 802.11b, 802.11 ac and the like. The interface may consist of multiple antennas encoders, demodulators and the like used to encode and decode information into the appropriate formats for transmission and decode information for demodulation. The wifi network interface 120 may be used to facilitate voice or text transmissions, or transmit and receive information from the internet. This information may include video, audio, and or images.

The universal serial bus (USB) interface 130 is used to transmit and receive information over a wired like, typically to a computer or other USB enabled device. The USB interface 120 can be used to transmit and receive information, connect to the internet, transmit and receive voice and text calls. Additionally, this wired link may be used to connect the USB enabled device to another network using the mobile devices cell network interace 110 or the wifi network interface 120. The USB interface 120 can be used by the main processor 150 to send and receive configuration information to a computer.

A memory 160, or storage device, may be coupled to the main processor 150. The memory 160 may be used for storing specific information related to operation of the mobile device and needed by the main processor 150. The memory 160 may be used for storing audio, video, photos, or other data stored and retrieved by a user.

Figure 2:
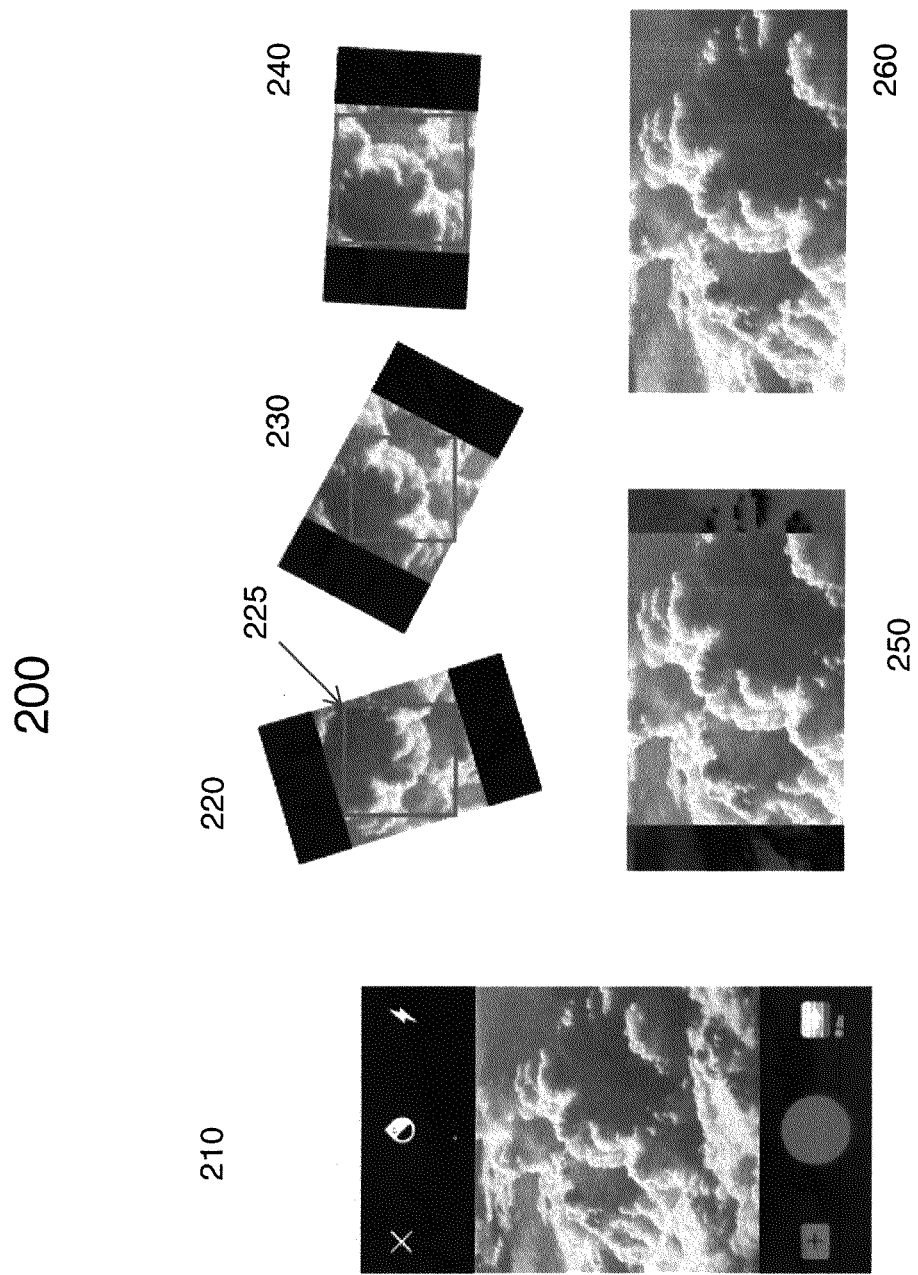
FIG. 2 shows an exemplary mobile device display having an active display according to the present invention.

The input output (I/O) interface 180, includes buttons, a speaker/microphone for use with phone calls, audio recording and playback, or voice activation control. The mobile device may include a touch screen 170 coupled to the main processor 150 through a touch screen controller. The touch screen 170 may be either a single touch or multi touch screen using one or more of a capacitive and resistive touch sensor. The smartphone may also include additional user controls such as but not limited to an on/off button, an activation button, volume controls, ringer controls, and a multi-button keypad or keyboard Turning now to FIG. 2 an exemplary mobile device display having an active display 200 according to the present invention is shown. The exemplary mobile device application is operative for allowing a user to record in any framing and freely rotate their device while shooting, visualizing the final output in an overlay on the device's viewfinder during shooting and ultimately correcting for their orientation in the final output.

According to the exemplary embodiment, when a user begins shooting their current orientation is taken into account and the vector of gravity based on the device's sensors is used to register a horizon. For each possible orientation, such as portrait 210, where the device's screen and related optical sensor is taller than wide, or landscape 250, where the device's screen and related optical sensor is wider than tall, an optimal target aspect ratio is chosen. An inset rectangle 225 is inscribed within the overall sensor that is best-fit to the maximum boundaries of the sensor given the desired optimal aspect ratio for the given (current) orientation. The boundaries of the sensor are slightly padded in order to provide 'breathing room' for correction. This inset rectangle 225 is transformed to compensate for rotation 220, 230, 240 by essentially rotating in the inverse of the device's own rotation, which is sampled from the device's integrated gyroscope. The transformed inner rectangle 225 is inscribed optimally inside the maximum available bounds of the overall sensor minus the padding. Depending on the device's current most orientation, the dimensions of the transformed inner rectangle 225 are adjusted to interpolate between the two optimal aspect ratios, relative to the amount of rotation.

For example, if the optimal aspect ratio selected for portrait orientation was square (1:1) and the optimal aspect ratio selected for landscape orientation was wide (16:9), the inscribed rectangle would interpolate optimally between 1:1 and 16:9 as it is rotated from one orientation to another. The inscribed rectangle is sampled and then transformed to fit an optimal output dimension. For example, if the optimal output dimension is 4:3 and the sampled rectangle is 1:1, the sampled rectangle would either be aspect filled (fully filling the 1:1 area optically, cropping data as necessary) or aspect fit (fully fitting inside the 1:1 area optically, blacking out any unused area with 'letter boxing' or 'pillar boxing'. In the end the result is a fixed aspect asset where the content framing adjusts based on the dynamically provided aspect ratio during correction. So for example a 16:9 video comprised of 1:1 to 16:9 content would oscillate between being optically filled 260 (during 16:9 portions) and fit with pillar boxing 250 (during 1:1 portions).

Additional refinements whereby the total aggregate of all movement is considered and weighed into the selection of optimal output aspect ratio are in place. For example, if a user records a video that is 'mostly landscape' with a minority of portrait content, the output format will be a landscape aspect ratio (pillar boxing the portrait segments). If a user records a video that is mostly portrait the opposite applies (the video will be portrait and fill the output optically, cropping any landscape content that falls outside the bounds of the output rectangle).

Figure 3:
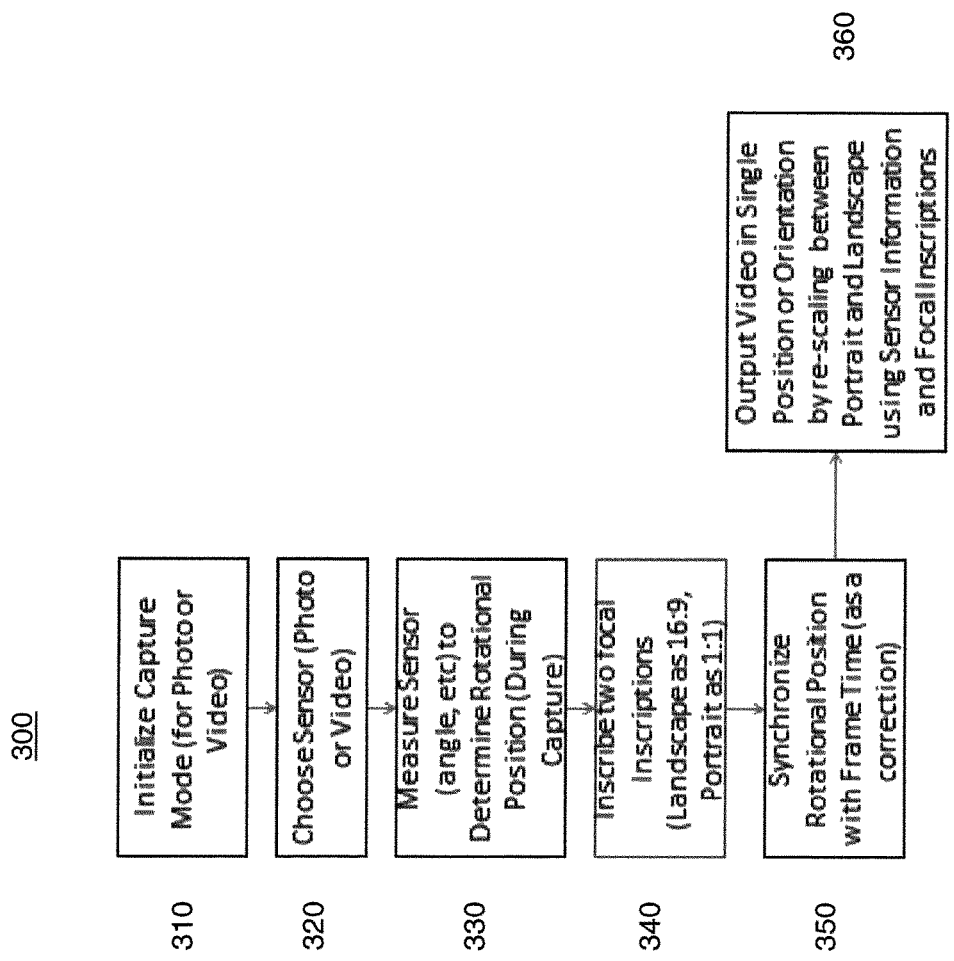
FIG. 3 shows an exemplary process for image stabilization and reframing in accordance with the present disclosure.

Referring now to FIG. 3, an exemplary process for image stabilization and reframing 300 in accordance with the present disclosure is shown. The system is initialized in response to the capture mode of the camera being initiated. This initialization may be initiated according to a hardware or software button, or in response to another control signal generated in response to a user action. Once the capture mode of the device is initiated, the mobile device sensor 320 is chosen in response to user selections. User selections may be made through a setting on the touch screen device, through a menu system, or in response to how the button is actuated. For example, a button that is pushed once may select a photo sensor, while a button that is held down continuously may indicate a video sensor. Additionally, holding a button for a predetermined time, such as 3 seconds, may indicate that a video has been selected and video recording on the mobile device will continue until the button is actuated a second time.

Once the appropriate capture sensor is selected, the system then requests a measurement from a rotational sensor 320. The rotational sensor may be a gyroscope, accelerometer, axis orientation sensor, light sensor or the like, which is used to determine a horizontal and/or vertical indication of the position of the mobile device. The measurement sensor may send periodic measurements to the controlling processor thereby continuously indicating the vertical and/or horizontal orientation of the mobile device. Thus, as the device is rotated, the controlling processor can continuously update the display and save the video or image in a way which has a continuous consistent horizon.

After the rotational sensor has returned an indication of the vertical and/or horizontal orientation of the mobile device, the mobile device depicts an inset rectangle on the display indicating the captured orientation of the video or image 340. As the mobile device is rotated, the system processor continuously synchronizes inset rectangle with the rotational measurement received from the rotational sensor 350. They user may optionally indicate a preferred final video or image ration, such as 1:1, 9:16, 16:9, or any ratio decided by the user. The system may also store user selections for different ratios according to orientation of the mobile device. For example, the user may indicate a 1:1 ratio for video recorded in the vertical orientation, but a 16:9 ratio for video recorded in the horizontal orientation. In this instance, the system may continuously or incrementally rescale video 360 as the mobile device is rotated. Thus a video may start out with a 1:1 orientation, but could gradually be rescaled to end in a 16:9 orientation in response to a user rotating from a vertical to horizontal orientation while filming. Optionally, a user may indicate that the beginning or ending orientation determines the final ratio of the video.

Figure 4:
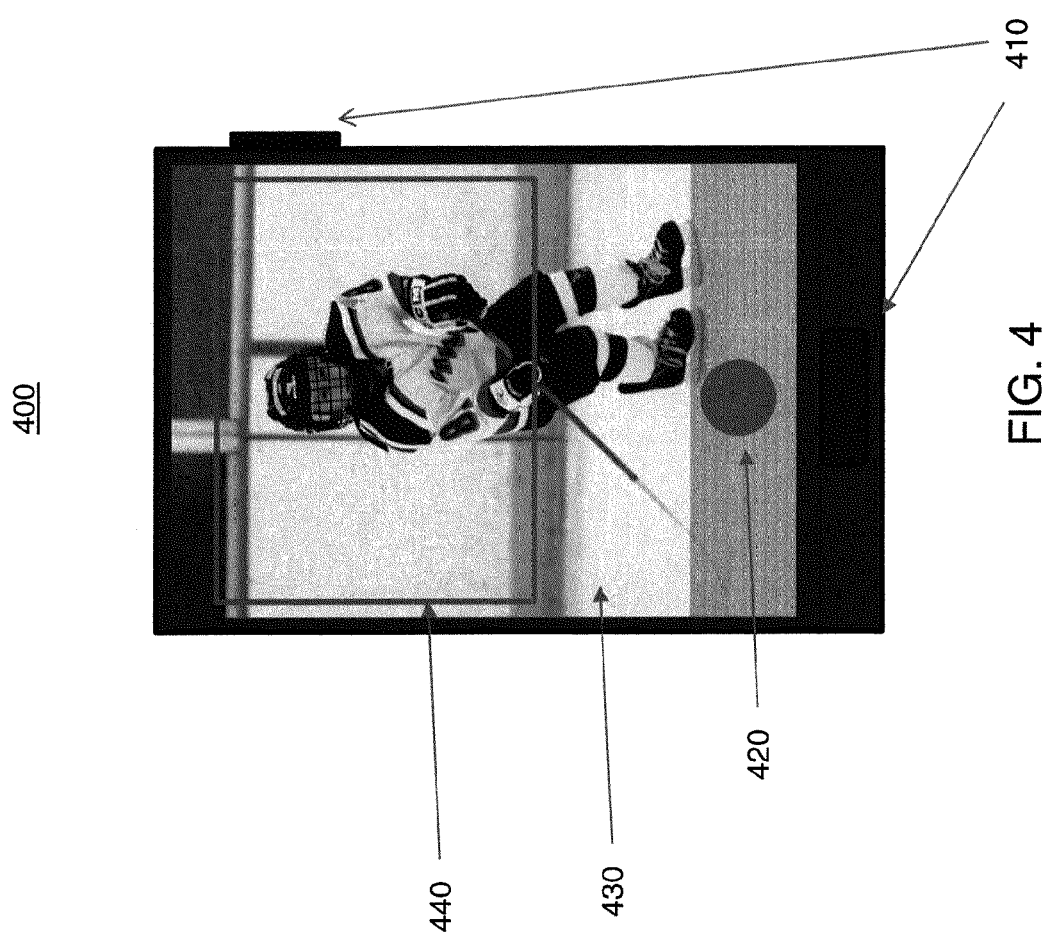
FIG. 4 shows an exemplary mobile device display having a capture initialization according to the present invention.

Turning now to FIG. 4, an exemplary mobile device display having a capture initialization 400 according to the present invention is shown. An exemplary mobile device is show depicting a touch tone display for capturing images or video. According to an aspect of the present invention, the capture mode of the exemplary device may be initiated in response to a number of actions. Any of hardware buttons 410 of the mobile device may be depressed to initiate the capture sequence. Alternatively, a software button 420 may be activated through the touch screen to initiate the capture sequence. The software button 420 may be overlaid on the image 430 displayed on the touch screen. The image 430 acts as a viewfinder indicating the current image being captured by the image sensor. An inscribed rectangle 440 as described previous may also be overlaid on the image to indicate an aspect ratio of the image or video be captured.

Figure 5:
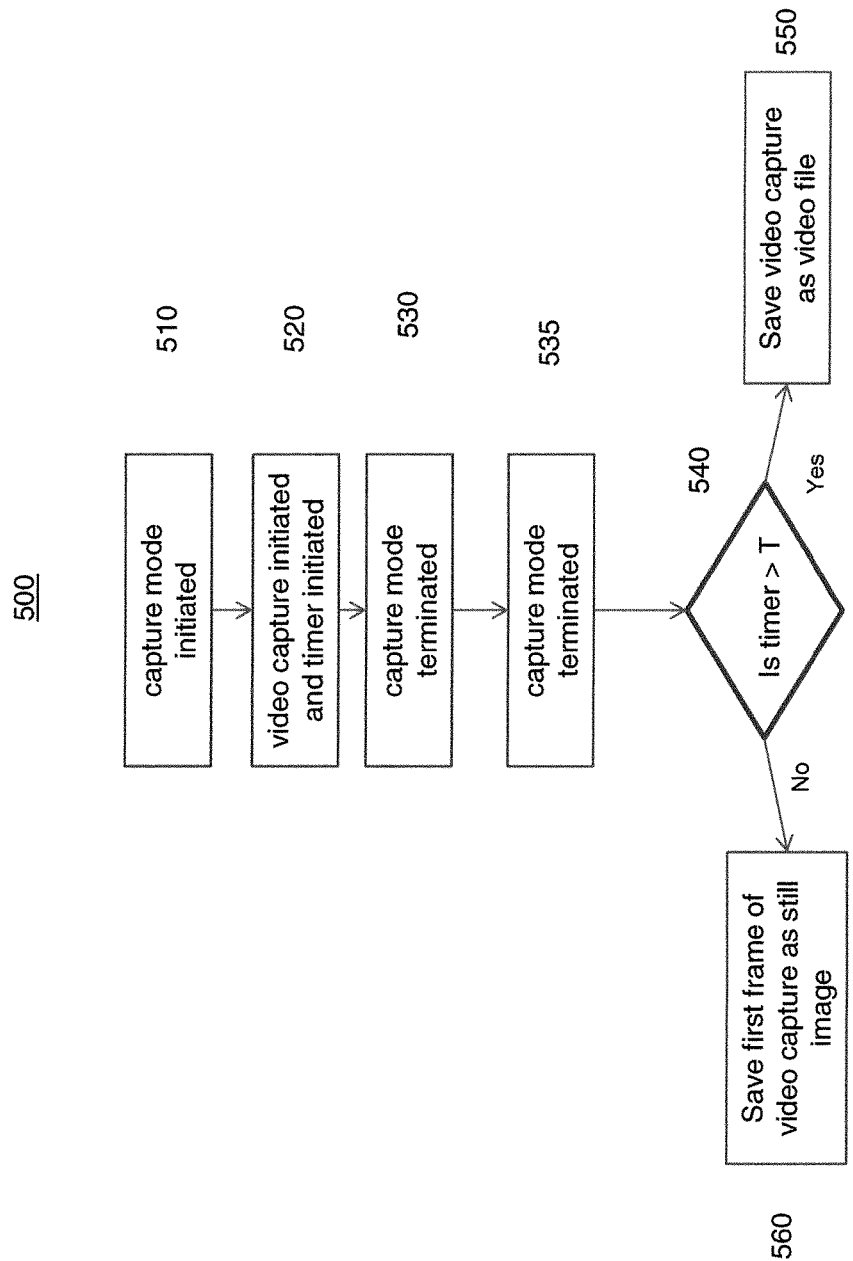
FIG. 5 shows an exemplary process for initiating an image or video capture in accordance with the present disclosure.

Referring now to FIG. 5, an exemplary process for initiating an image or video capture 500 in accordance with the present disclosure is shown. Once the imaging software has been initiated, the system waits for an indication to initiate image capture. Once the image capture indication has been received by the main processor 510, the device begins to save the data sent from the image sensor 520. In addition, the system initiates a timer. The system then continues to capture data from the image sensor as video data. In response to a second indication from the capture indication, indicating that capture has been ceased 530, the system stops saving data from the image sensor and stops the timer.

The system then compares the timer value to a predetermined time threshold 540. The predetermined time threshold may be a default value determined by the software provider, such as 1 second for example, or it may be a configurable setting determined by a user. If the timer value is less than the predetermined threshold 540, the system determines that a still image was desired and saves the first frame of the video capture as a still image in a still image format, such as jpeg or the like 560. The system may optionally chose another frame as the still image. If the timer value is greater than the predetermined threshold 540, the system determines that a video capture was desired. The system then saves the capture data as a video file in a video file format, such as mpeg or the like 550. The system then may then return to the initialization mode, waiting for the capture mode to be initiated again. If the mobile device is equipped with different sensors for still image capture and video capture, the system may optionally save a still image from the still image sensor and start saving capture data from the video image sensor. When the timer value is compared to the predetermined time threshold, the desired data is saved, while the unwanted data is not saved. For example, if the timer value exceeds the threshold time value, the video data is saved and the image data is discarded.

Figure 6:
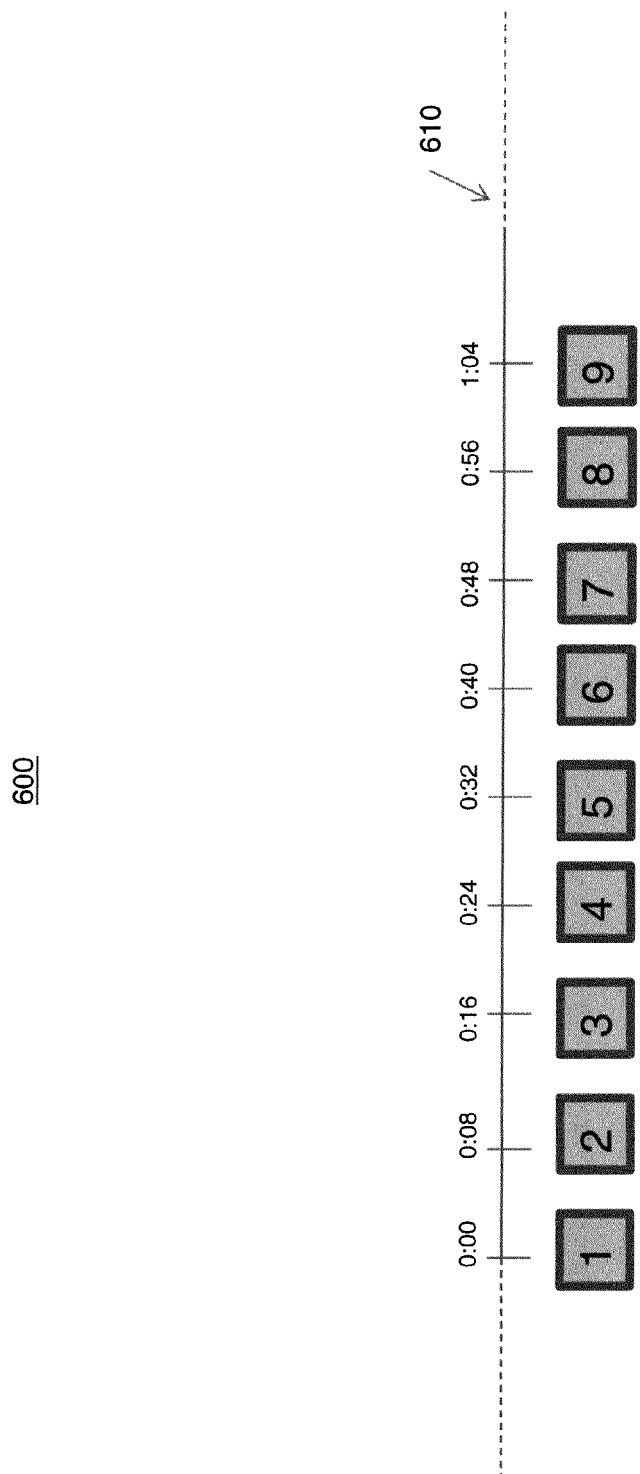
FIG. 6 shows an exemplary embodiment of automatic video segmentation according to an aspect of the present invention.

Turning now to FIG. 6, an exemplary embodiment of automatic video segmentation 600 is shown. The system is directed towards automatic video segmentation that aims to compute and output video that is sliced into segments that are as close to a predetermined time interval in seconds as possible. Additionally the segments may be longer or shorter dependant in response to attributes of the video being segmented. For example, it is not desirable to bisect content in an awkward way, such as in the middle of a spoken word. A timeline 610 is shown, depicting a video segmented into nine segments (1-9). Each of the segments is approximately 8 seconds long. The original video has a length of at least 1 minute and 4 seconds.

In this exemplary embodiment, the time interval chosen for each video segment is 8 seconds. This initial time interval may be longer or shorter, or may be optionally configurable by the user. An 8 second base timing interval was chosen as it currently represents a manageable data segment having a reasonable data transmission size for downloading over various network types. An approximately 8 second clip would have a reasonable average duration to expect an end user to peruse a single clip of video content delivered in an exploratory manner on a mobile platform. A clip of approximately 8 seconds may be a perceptually memorable duration of time where an end user can theoretically retain a better visual memory of more of the content it displays. Additionally, 8 seconds is an even phrase length of 8 beats at 120 beats per minute, the most common tempo of modern Western music. This is approximately the duration of a short phrase of 4 bars (16 beats) which is the most common phrase length (duration of time to encapsulate an entire musical theme or section). This tempo is perceptually linked to an average active heart rate, suggesting action and activity and reinforcing alertness. Furthermore, having a small, known size clip facilitates easier bandwidth calculations based upon given that video compression rates and bandwidth are generally computed around base-8 numbers, such as megabits per second, where 8 megabits=1 megabyte, therefore each segment of video would be around 1 megabyte when encoded at 1 megabits per second.

Figure 7:
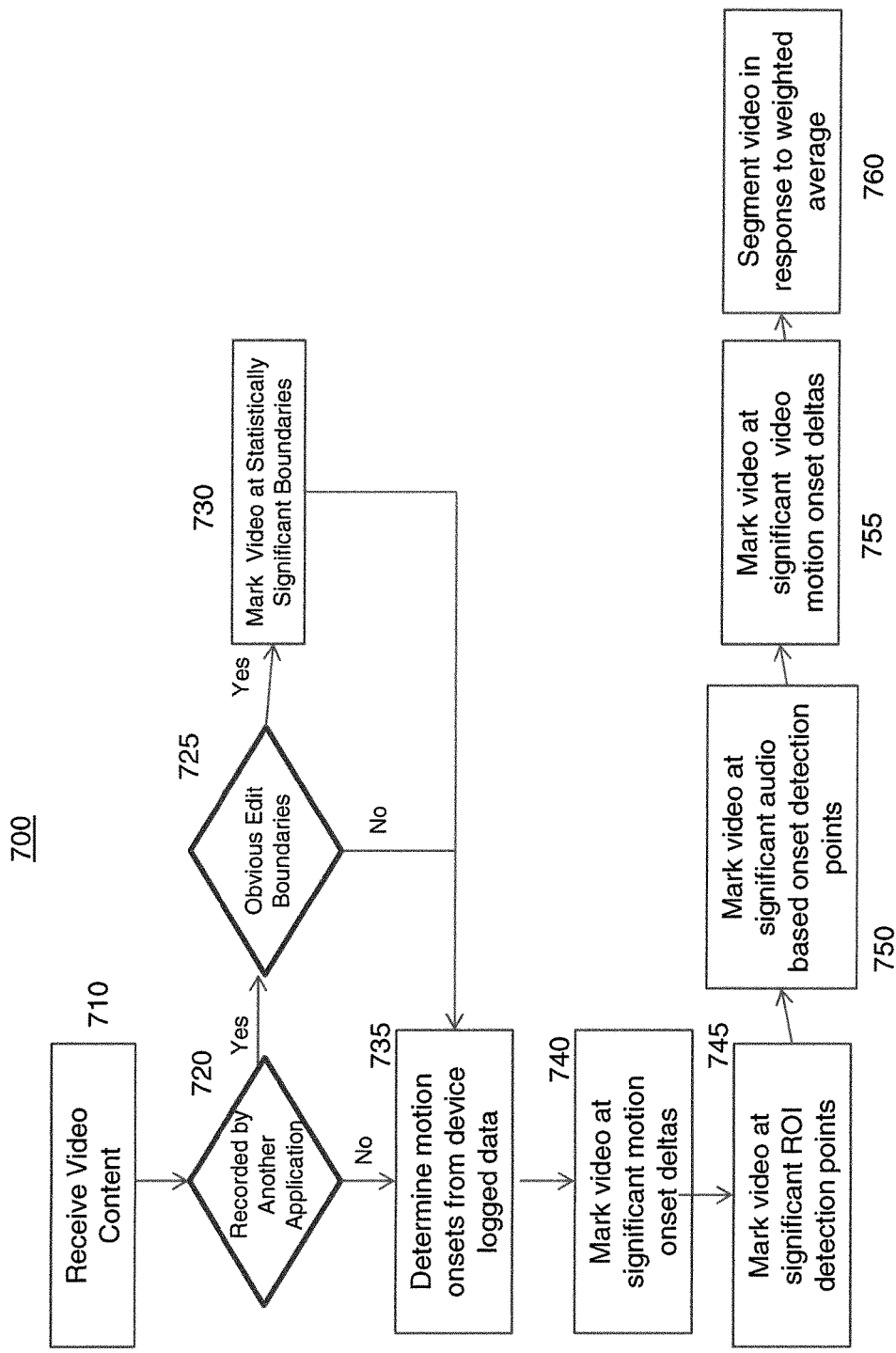
FIG. 7 shows a method of segmenting a video in accordance with the present invention.

Turning now to FIG. 7, a method of segmenting a video 700 in accordance with the present invention is shown. In order to procedurally fragment video content into ideal segments of 8 seconds on perceptually good edit boundaries, a number of approaches to analyzing the video content may be applied within the system. First, an initial determination may made regarding the nature of the video content as to whether it originated from another application or was recorded using the current mobile device 720. If the content originated from another source or application, the video content is analyzed first for obvious edit boundaries using scene break detection 725. Any statistically significant boundaries may be marked, with emphasis on the boundaries on or nearest to the desired 8 second interval 730. If the video content was recorded using the current mobile device, the sensor data may be logged while recording 735. This may include the delta of movement of the device on all axes from the device's accelerometer and/or the rotation of the device on all axes based on the device's gyroscope. This logged data may be analyzed to find motion onsets, deltas that are statistically significant relative to the mean magnitude over time for any given vector. These deltas are logged with emphasis on the boundaries nearest to the desired 8 second interval 740.

The video content can be further perceptually analyzed for additional cues that can inform edit selection. If the device hardware, firmware or OS provides any integrated region of interest (ROI) detection, including face ROI selection, it is utilized to mark any ROIs in the scene 745. The onset appearance or disappearance of these ROIs (i.e. the moments nearest when they appear in frame and disappear from frame) can be logged with emphasis on the boundaries nearest to the desired 8 second interval.

Audio-based onset detection upon overall amplitude will look for statistically significant changes (increases or decreases) in amplitude relative to either the zero crossing, a noise floor or a running average power level 750. Statistically significant changes will be logged with emphasis on those nearest to the desired 8 second interval. Audio-based onset detection upon amplitude within spectral band ranges will rely on converting the audio signal using a FFT algorithm into a number of overlapping FFT bins. Once converted, each bin may be discreetly analyzed for statistically significant changes in amplitude relative to its own running average. All bins are in turn averaged together and the most statistically significant results across all bands are logged as onsets, with emphasis on those nearest to the desired 8 second interval. Within this method the audio can be preprocessed with comb filters to selectively emphasize/deemphasize bands, for example, the bands in the range of normal human speech can be emphasized whereas high frequency bands synonymous with noise can be deemphasized.

Visual analysis of the average motion within content can be determined for a video content to help establish an appropriate segmentation point 755. At a limited frame resolution and sampling rate as required for real time performance characteristics, the magnitude of the average motion in-frame can be determined and used to look for statistically significant changes over time, logging results with emphasis on those nearest to the desired 8 second interval. Additionally, the average color and luminance of the content can be determined using a simple, low resolution analysis of the recorded data, logging statistically significant changes with emphasis on those nearest to the desired 8 second interval.

Once any or all of the above analysis is completed, the final logged output may be analyzed weighting each result into an overall average 760. This post-processing pass of the analysis data finds the most viable points in time based on the weighted and averaged outcome of all individual analysis processes. The final, strongest average points on or nearest the desired 8 second interval are computed as output that forms the model for fragmentation edit decisions.

The post processing step 760 may consider any or all of the previously mentioned marked points on the video as indicators of preferred segmentation points. The different determination factors can be weighted. Also, determination points that vary too far from the preferred segment length, such as 8 seconds, may be weighted lower than those closest to the preferred segment length.

Figure 8:
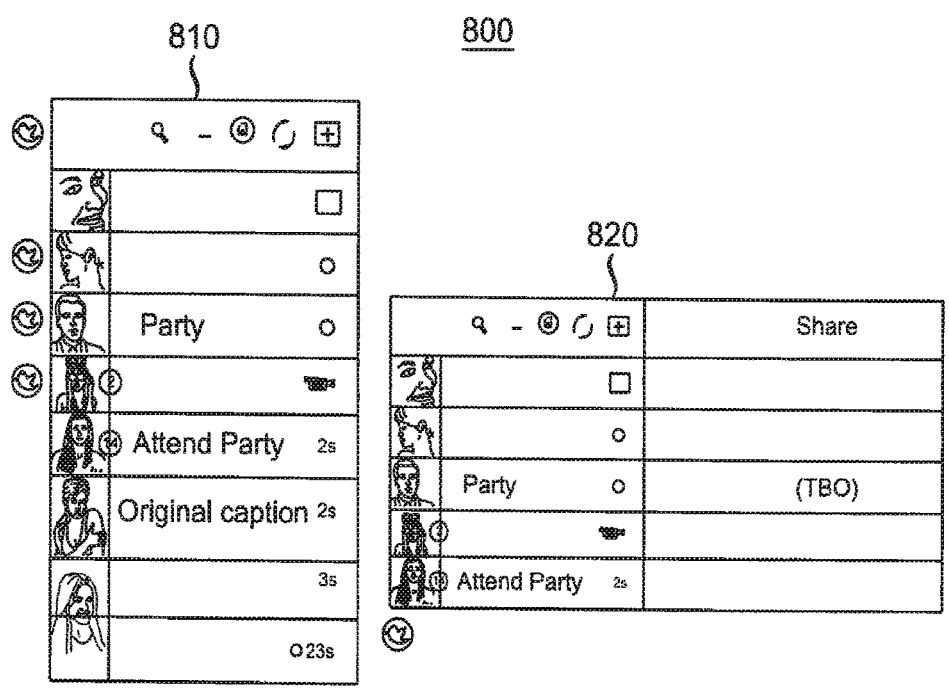
FIG. 8 shows a light box application according to one aspect of the present invention.

Turning now to FIG. 8, a light box application 800 according to one aspect of the present invention is shown. The light box application is directed towards a method and system for using a list-driven selection process to improve video and media time-based editing. The light box application is shown in both the vertical 810 and the horizontal orientation 820. The light box application may be initiated after a segmented video has been saved. Alternatively, the light box application may be initiated in response to a user command. Each of the segments is initially listed chronologically with a preview generated for each. The preview may be a single image taken from the video segment or a portion of the video segment. Additional media content or data can be added to the light box application. For example, photos or videos received from other sources may be included in the light box list to permit a user to share or edit the received content or combine these received contents with newly generated content. Thus, the application permits video and media time-based editing into a simple list driven selection process.

The light box application may be used as a center point for sharing editorial decisions. The light box allows users to quickly and easily view content and decide what to keep, what to discard, and how and when to share with others. The light box function may work with the camera, with channel browsing or as a point to import media from other places. The light box view may contain a list of recent media or grouped sets of media. Each item, image or video, is displayed as at thumbnail, with a caption, aduration, and a possible group count. The caption may be generated automatically or by the user. The duration may be simplified, so as to present to the user the weight and pace of the media content. The light box title bar may include the category of the light box set with its item count, along with navigation to go back, import an item, or open a menu.

The light box landscape view 820 offers a different layout, with media items listed on one side and optionally, a method of sharing in some immediately assessable form on the other side. This may include links or previews of facebook, twitter, or other social media applications.

Figure 9:
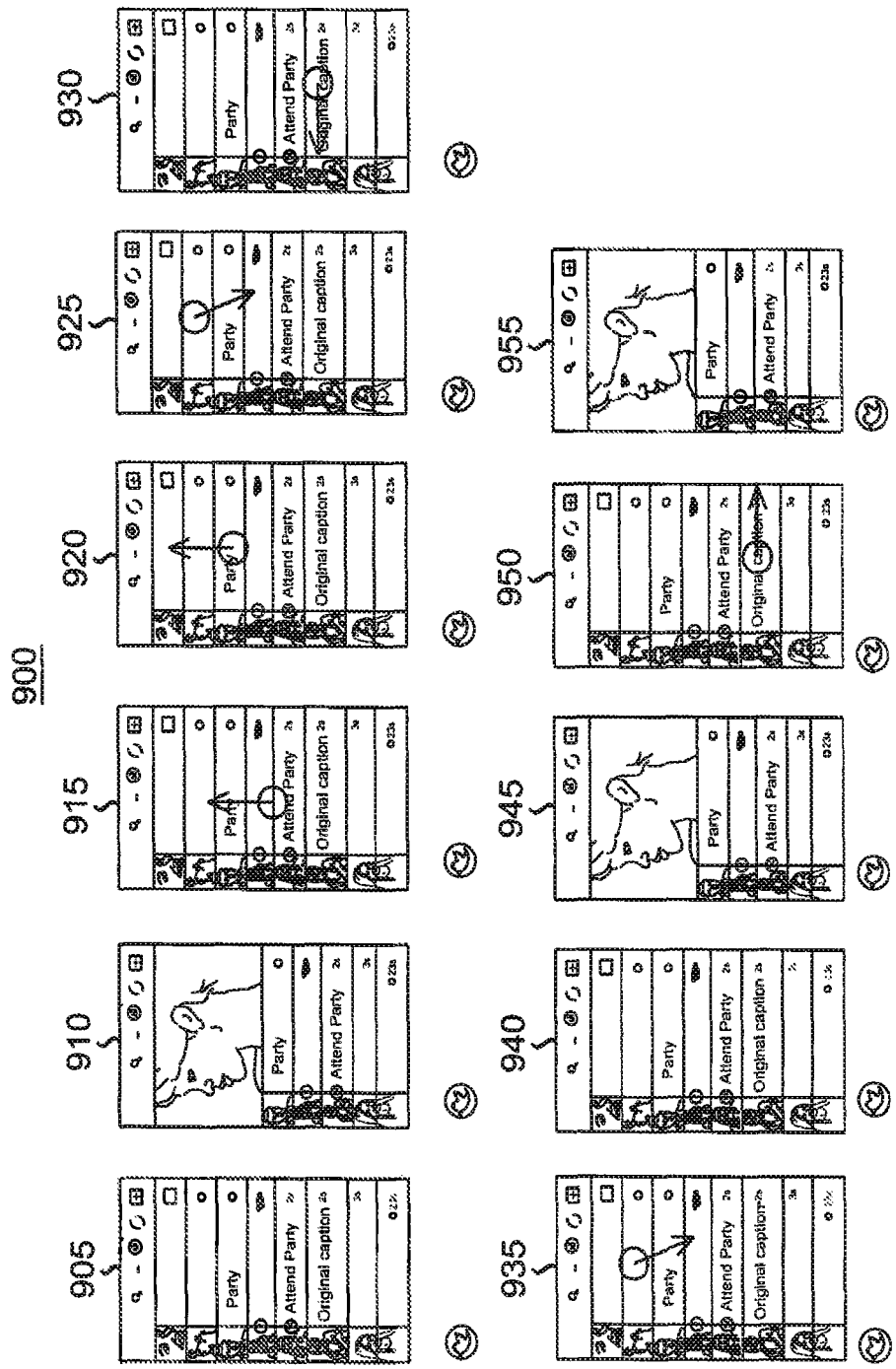
FIG. 9 shows various exemplary operations that can performed within the light box application.
Figure 10:
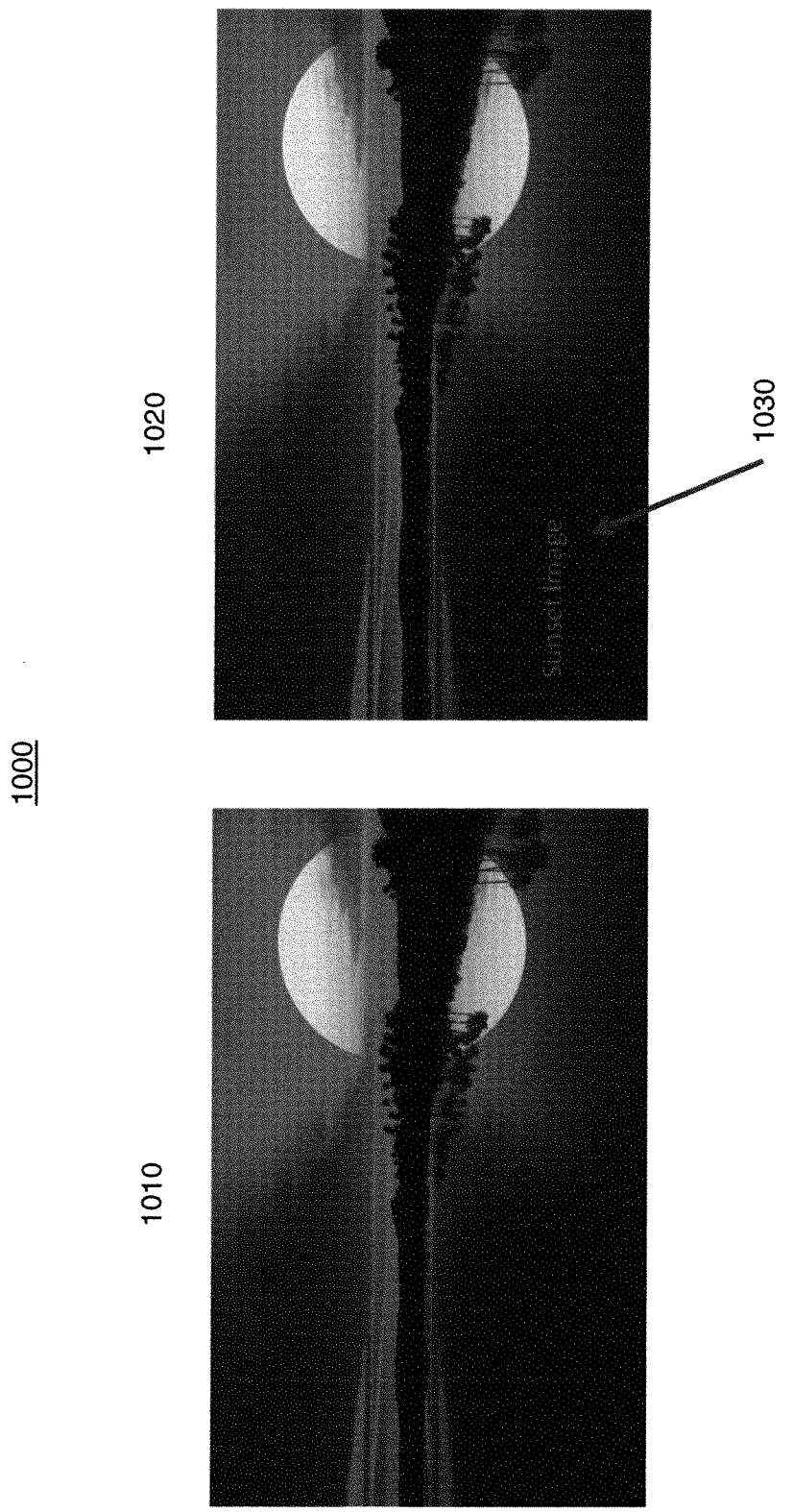
FIG. 10 shows an exemplary caption color generation application according to one aspect of the present invention.

Turning now to FIG. 9, various exemplary operations 900 that can performed within the light box application are shown. Media that is captured, by an integrated camera feature for example, imported from the device's existing media library, possibly recorded with or created by other applications or downloaded from web based sources, or curated from content published directly within the related application is all collected into the light box in a preview mode 905. The light box presents media in a simple vertical list, categorized into groups based on events, such as groupings of time, within which the media was collected. Each item is represented by a list row including a thumbnail or simplified duration for the given piece of media. By tapping on any item the media can be previewed in an expanded panel that displays in direct relation to the item.

The light box application may optionally have an expanded items view 910, which previews the item. The expanded items view 910 exposes options to processing the media item, captioning, and sharing it. Tapping the close button closes the item or tapping another item below it closes the item and opens another.

Scrolling up or down within the light box application permits the user to navigate the media items 915. The header may remain at the top of the list, or it may float atop the content. Scrolling to the end of a list may enable navigation to other, older lists 920. The headings of the older lists may be revealed under tension while dragging. Dragging past tension transitions to the older lists. Holding and dragging on an item allows the user to reorder items or combine items by dragging one onto another 925. Swiping an item to the left removes the item from the light box 930. Removing items may or may not remove them from the device, not just the light box application. Dragging and dropping items onto other items may be used to combine the items into a group 935, or combine the dragged item into a group. Pinching items together combines all items that were within the pinch rage into a group 940. When previewing combined items, they play sequentially and show an item count that can be tapped to expand the combined items below the preview window 945. The regular light box items may then be pushed down to permit the expanded items to be displayed as rows.

Items can be manipulated by dragging on them from within the light box application. Items can be removed from the light box application by dragging left on any item the item for example 930. By dragging right on any item, the item can be promoted to publish immediately 950, which transitions to a screen allowing the user to share the given item's media on one or many sharing locations 955. Tapping a share button when previewing may also enable the sharing of an item. By pressing holding on any item it becomes draggable, at which point the item can be dragged up and down to re-organize its position in the overall list. Time in the list is represented vertically, top-to-bottom. For example, the top most item is first in time were the media to be performed sequentially. Any whole group of items (kept under a single event heading) can be collectively previewed (played sequentially as a single preview comprised of all items in order of time), can be collectively deleted or published using the same gestures and means of control as a single list item. When previewing any item that contains video or time-based media, playback can be controlled by dragging left-to-right on the related list item row. The current position in time is marked by a small line that can be dragged to offset time during playback by the user. When previewing any item that contains video or time-based media, by pinching with 2 fingers horizontally upon the related list item row a selection range is defined which can be pinched and dragged in order to trim the original media as the final playback output. When previewing any item that contains an image or still media, by dragging left-to-right or right-to-left on the related list item row any additional adjacent frames captured can be selectively 'scrubbed'. For example if during a single photo capture the camera records several frames of output, this gesture can allow the user to cycle through and select the best frame as the final still frame.

Items that have recently been published (uploaded to one or many publishing destinations) are automatically cleared from the light box list. Items that time out, or live in the light box for longer than a prolonged inactivity period, such as several days, are automatically cleared from the light box list. The light box media is built upon a central, ubiquitous storage location on the device so that other applications who incorporate the same light box view all share from the same current pool of media. This makes multi-application collaboration on multimedia asset editing simple and synchronous.

Turning now to 10, an exemplary caption color generation application 1000 according to one aspect of the present invention is shown. One view shows the original image 1010 on which a user wishes to overlay a caption. The caption may be generated through user input, or generated automatically by the application. The application may recognize the content of the image, may search the internet or a database for similar images and examine metadata or captions associated with that similar image to generate the text of the caption. The second view shows an altered image 1020 with a caption 1030 overlaid on the image. The color of the caption has been chosen to contrast with the image in such a way as to be pleasing to the eye, but still make the caption legible to a viewer.

The system 1000 uses an algorithm which determines the color most prominent in an image. The predominant color is the color most frequently used in an image. A dominant color is a color that has more influence in an image and therefore appears to a viewer as the defining color of an image. For example, if an image is mostly black but has a large red shape displayed, a viewer might define the image as mostly red, when in fact the predominant color is black. Thus, the dominant color and the predominant color may not be the same. In this exemplary embodiment, red is the predominant color in the image. The system may determine this color prominence in a number of different ways. The system may take an average of the colors in the image and select a caption color in response to this average and select this as the predominant color. The image may look for the most commonly used color and select this as the predominant color. The application may then use the predominant color as the caption color or select one of a discrete number of predetermined colors.

Figure 11:
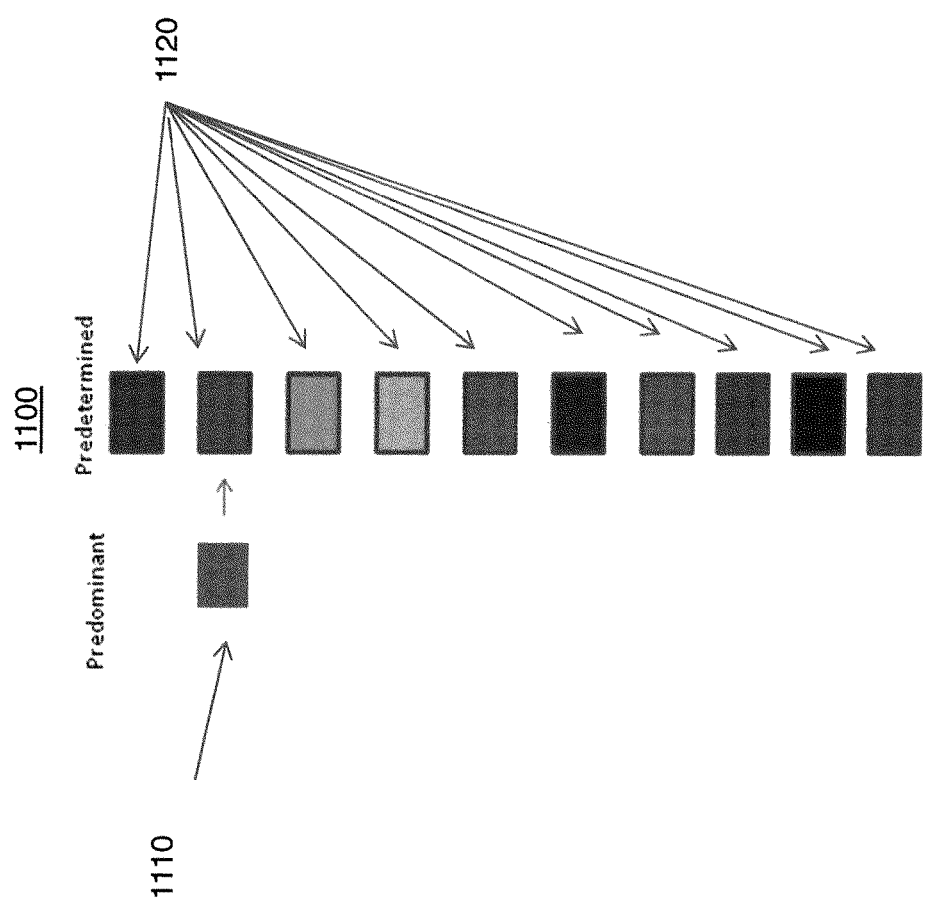
FIG. 11 shows a color selection chart according to an exemplary aspect of the present invention.

Turning now to FIG. 11, a color selection chart according to an exemplary aspect of the present invention is shown. The system is operative to match the predominant color 1110 with a discrete number of predetermined colors 1120. System designers may wish to use certain colors due to memory issues, aesthetics, etc. For example, the system may not want to use black or white, or any pastel colors. Alternatively, the system may be operative to match the predominant color with a recessive color. A recessive color, unlike a dominant color, fades into the background. These recessive colors, such as lavender, pink or gray, take on the properties of surrounding color. Contrasting recessive colors may be more desirable than dominant colors as they permit the caption to be read, but do not distract from the image or video they are overlaid upon. Once a match is made, the caption or text is overlaid in the matched color.

The system may then select a location to display the caption. The caption may be displayed in a default location, such as the lower left, or the caption may be placed after an analysis of the color locations of the image. In the case of the default location, the system may determine the predominant color proximate to the default location within the image or video. Thus, the caption would still have the desired level of contrast between the image and the caption text. It should be understood that displaying an image and a caption could mean displaying on a display screen or generating a signal suitable for coupling to a display device.

Alternatively, the system may wish to use the same color of caption for a series of images, such as a video. In this case, the system may analyze each image for a predominant color and then take the most common predominant color and use this most common predominant color as the text color for the caption overlaid on all the images. The system may determine a location within the series of images which has the smallest color variation over all the frames or a number of frames. This location may be selected as the location to place the caption. The predominant color of this location within all the series of images would then be analyzed to select a text color according to previously described method. The text color would be used to display the caption in the location on all images or video frames.

It should be understood that the elements shown and discussed above, may be implemented in various forms of hardware, software or combinations thereof. Preferably, these elements are implemented in a combination of hardware and software on one or more appropriately programmed general-purpose devices, which may include a processor, memory and input/output interfaces. The present description illustrates the principles of the present disclosure. It will thus be appreciated that those skilled in the art will be able to devise various arrangements that, although not explicitly described or shown herein, embody the principles of the disclosure and are included within its scope. All examples and conditional language recited herein are intended for informational purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that the block diagrams presented herewith represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The invention claimed is:

1. A method for automatically selecting a color for overlap on a series of images for presentation on a media device, comprising:
   determining, by a processor, a caption location within the series of images, the caption location being a location within an image of the series of images which has a smallest color variation over a plurality of images of the series of images;
   analyzing, by the processor, the series of images to determine a set of most commonly used colors by selecting, for each image of the series of images, a most commonly used color in the image in a proximity of the caption location;
   generating a text string; and
   displaying, via a display, the series of images and the text string, the text string being displayed at the caption location in a caption color for each image of the series of images, the caption color being selected based on the most common color in the determined set of most commonly used colors.

2. The method of claim 1, wherein the series of images are comprised in a video.

3. An apparatus to automatically select a color for overlap on a series of images for presentation on a media device, comprising:
   a memory for storing a series of images; and
   a processor configured to:
      determine a caption location within the series of images, the caption location being a location within an image of the series of images which has a smallest color variation over a plurality of images of the series of images;
      analyze the series of images to determine a set of most commonly used colors by selecting, for each image of the series of images, a most commonly used color in the image in a proximity of the caption location; and
      generate a text string; and
   a display configured to display the series of images and the text string, the text string being displayed at the caption location in a caption color for each image of the series of images, the caption color being selected based on the most common color in the determined set of most commonly used colors.

4. The apparatus of claim 3, wherein the series of images are comprised in a video.

* * * * *